(12) United States Patent
Mercer (10) Patent No.: US 7,991,957 B2
(45) Date of Patent: Aug. 2, 2011

(54) ABUSE DETECTION USING DISTRIBUTED CACHE

(75) Inventor: David Mercer, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 694 days.

(21) Appl. No.: 12/127,014

(22) Filed: May 27, 2008

(65) Prior Publication Data

US 2009/0300322 A1 Dec. 3, 2009

(51) Int. Cl.
G06F 12/00 (2006.01)

(52) U.S. Cl. ...................................................... 711/118

(58) Field of Classification Search ........................ None
See application file for complete search history.

(56) References Cited

U.S. PATENT DOCUMENTS

| | | | |
|---|---|---|---|
| 6,895,402 B1 | 5/2005 | Emens et al. | |
| 6,970,904 B1 | 11/2005 | Rode | |
| 7,260,639 B2 | 8/2007 | Afergan et al. | |
| 7,574,587 B2 * | 8/2009 | DeWitt et al. | 712/227 |
| 2004/0117654 A1 | 6/2004 | Feldman et al. | |
| 2004/0243843 A1 | 12/2004 | Kadobayashi et al. | |

FOREIGN PATENT DOCUMENTS

WO 2007/089943 A2 8/2007

OTHER PUBLICATIONS

Wirken, "Bandwidth Robbery Through Hotlinking", Jul. 29, 2006. Webpage Available at http://www.selfseo.com/story-18470.php.
"Hotlinking issues—protecting your copyright, images and bandwidth", Webpage Available at http://www.tamingthebeast.net/articles6/hotlinking-protection.htm.
Andrew, "How can I protect my images from hotlinkers?" Oct. 19, 2004. Webpage available at http://support.agcc.net/index.php?_a=knowledgebase&_i=questiondetails&_i=15&nav2=General%20support.
"How to Block Hotlinkers" Webmaster Tips 'n' Tutorials. Webpage Available at http://www.chauy.com/2006/09/how-to-block-hotlinkers/.
Heng, "How to Protect Your Images from Bandwidth Thieves", Webpage available at http://www.thesitewizard.com/archive/protectimages.shtml.
"Image Protection Rocket Prevent Image Copying & Stop Bandwidth Leeching", Webpage Available at http://www.marketingrocket.com/prodipr.php.
"How do I stop Hotlinking and Bandwidth Theft?", Webpage Available at http://altlab.com/htaccess_tutorial.html.

* cited by examiner

Primary Examiner — Hiep T Nguyen (57) ABSTRACT

Abuse of a content-sharing service is detected by an arrangement in which an in-memory cache is distributed among a plurality of nodes, such as front-end web servers, and which caches each item accessed by users of the service as a single instance in the distributed cache. Associated with each cached item is a unit of metadata which functions as a counter that is automatically incremented each time the item is served from the distributed cache. Because abusive items often tend to become quickly popular for downloading, when the counter exceeds a predetermined threshold over a given time interval, it is indicative of an access rate that makes the item a candidate for being deemed abusive. A reference to the item and its access count are responsively written to a persistent store such as a log file or database.

20 Claims, 6 Drawing Sheets

ABUSE DETECTION USING DISTRIBUTED CACHE

BACKGROUND

Content-sharing services that operate through websites by which members of the public can upload and share items of content such as photographs and files are commonly subject to abuse. Such abuse may often involve the user's violation of the terms of use that are typically imposed as conditions for using a service. Such violations may include, for example, uploading of copyrighted materials without the permission of the copyright owner and uploading of inappropriate or offensive materials. In addition, third party websites may utilize the services' servers as large object stores for items such as banner advertisements and stock images in a commercial context in violation of the terms of use. In this latter case, the website will often serve an "href" link destination in its HTML (Hypertext Markup Language) code to a file in the external large object store in order to circumvent costs associated with local storage and bandwidth. This then causes the content-sharing website which is serving the files to incur the storage and bandwidth costs.

Abuse of content-sharing services can often be difficult to detect. Traditionally, detection is performed by an administrator or analyst who parses logs generated by the service's web servers and then tabulates hit counts for items being downloaded. If the administrator determines the hit count to be excessive, which can often be evidence of abuse, the administrator can then take steps to confirm the abuse. Unfortunately, this detection approach can be time consuming, expensive, and computationally-intensive as it generally involves importing some portion of the logs into a database and performing queries.

Another difficulty is that the service may utilize many servers. Thus the examination of a single log may not necessarily result in detection of abuse if the abusive item is downloaded across multiple servers, but not excessively so from any given server to arouse scrutiny. But while such traditional abuse detection approach may still be effective, a significant drawback is that it cannot be performed in real time or near real time with the occurrence of the abuse. Because the databases containing the server logs can be very large, often exceeding a terabyte in size, the importing and querying can take hours or even days to complete. This can result in an increase in the service's costs and an increase in the time of exposure for the abusive items on the website.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Abuse of a content-sharing service is detected by an arrangement in which an in-memory cache is distributed among a plurality of nodes, such as front-end web servers, and which caches each item accessed by users of the service as a single instance in the distributed cache. Associated with each cached item is a unit of metadata which functions as a counter that is automatically incremented each time the item is served from the distributed cache. Because abusive items often tend to become quickly popular for downloading, when the counter exceeds a predetermined threshold over a given time interval, it is indicative of an access rate that makes the item a candidate for being deemed abusive. A reference to the item and its access count are responsively written to a persistent store such as a log file or database. An administrator or analyst monitoring the persistent store may then verify whether the item is abusive or legitimate, and then take appropriate remedial actions if it is found to be abusive. If not, the administrator/analyst can flag the item as legitimate so that it does not need to be reviewed again.

In an illustrative example, each cached item is uniquely identified using a collection ID (identification) that is typically associated with a user and an item ID. Items are evicted from the cache when they become stale through application of a least-recently-used eviction policy that is triggered based on the elapse of a predetermined time interval or memory pressure on the distributed cache. When an item is evicted from the distributed cache, its associated counter is also checked against the threshold to automatically determine if the evicted item is a candidate for being abusive.

Advantageously, the present distributed caching arrangement identifies potentially abusive items in near real time in an automated manner which enables service administrators to respond faster to confirm abuse and then take steps to remediate the problem. And identification of only items whose access counters exceed the threshold over a predetermined time interval as abusive—which means that the items are quickly gaining popularity for downloading (i.e., are becoming "hot" items)—improves abuse detection accuracy and reduces opportunities for mischaracterizing items that would need to be reviewed to confirm their legitimacy.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
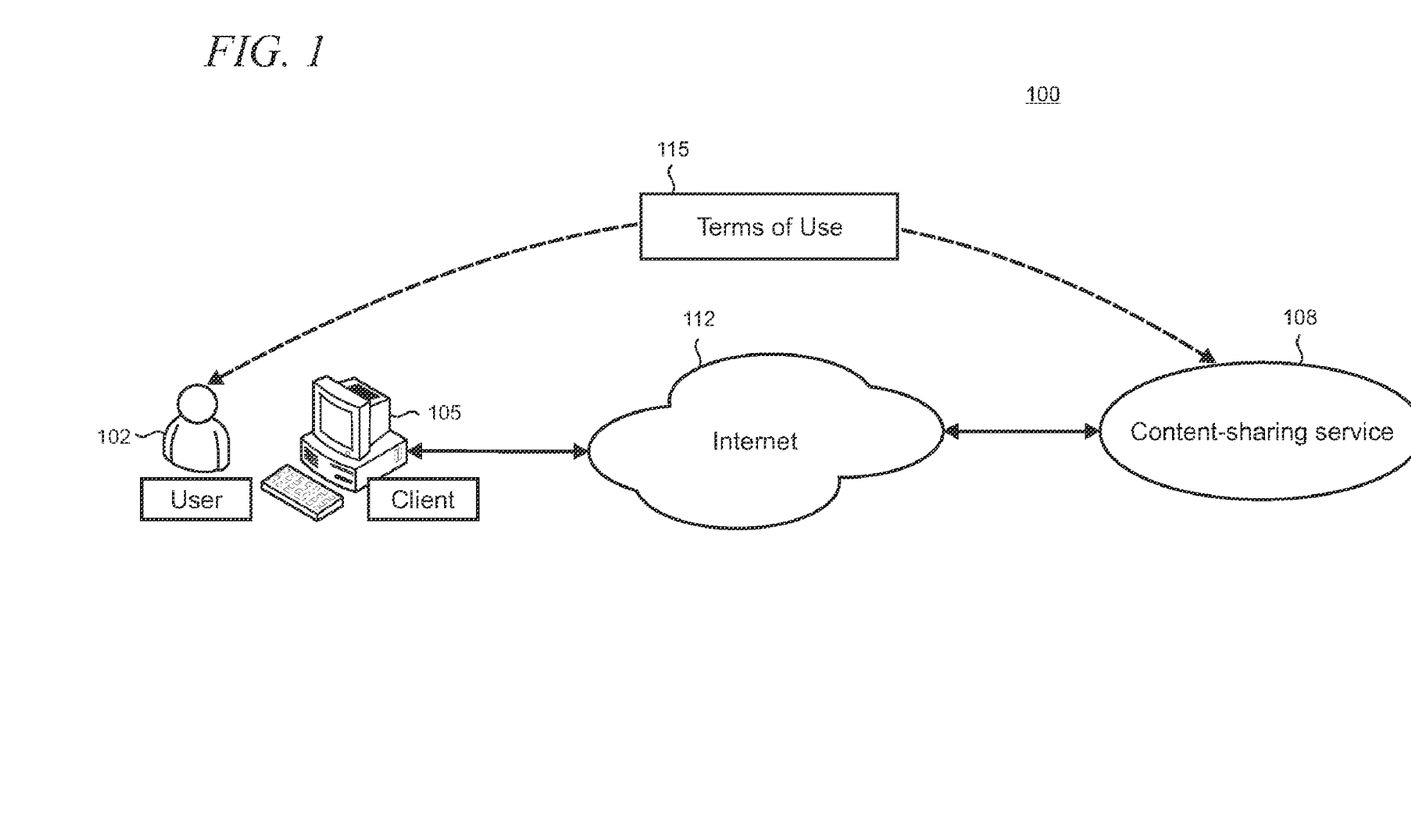
FIG. 1 shows an illustrative computing environment in which a user accesses a Web-enabled content-sharing service over the Internet, where the service is subject to terms of use.

FIG. 1 shows an illustrative computing environment 100 in which the present arrangement for abuse detection using a distributed cache may be implemented. As shown, a user 102 at a client 105, such as a PC (personal computer) or portable computing device like a web-capable mobile phone or pocket PC, accesses a Web-enabled content-sharing service 108 over a public network such as the Internet 112. The service 108 may be alternatively implemented to provide a variety of different features and functionalities, but will typically enable the user to upload data or content such as photographs, images, and documents to a website for the purpose of sharing the content with other users.

In this example, the service 108 provided to the user 102 is subject to terms of use as indicated in FIG. 1 by reference numeral 115. That is, the user 102 must agree to abide to certain terms, or codes of conduct and the like, as a condition for using the service 108. While they can vary, terms of use are commonly utilized whether the service to which they apply is free to the user, or is provided on a fee basis. In particular, the terms of use often impose prohibitions on use of certain content (which may include text, images, sound, video, data, information, or software, for example).

Table 1 below shows an illustrative code of conduct that Microsoft Corporation typically applies to its Windows Live™ branded services. However, it emphasized that the terms contained in the code of conduct shown in Table 1 are intended to be exemplary and other terms may be used in a given implementation as may be required by the particular circumstances.

In addition to the code of conduct shown in Table 1, other terms of use may also be applicable to the user 102 when using the service 108. These other terms may comprise service agreements including the terms shown in Tables 2 and 3 below.

Service Agreement

TABLE 2

How You May Use the Service. In using the service, you will:

1. obey the law;
2. obey any codes of conduct or other notices we provide;
3. obey the Microsoft Anti-spam Policy, which is available at http://privacy.msn.com/anti-spam
4. keep your service account password secret; and
5. promptly notify us if you learn of a security breach related to the service.

Code of Conduct

TABLE 1

You will not upload, post, transmit, transfer, distribute or facilitate distribution of any content or otherwise use the service in any way that:

1. depicts nudity of any sort including full or partial human nudity or nudity in non-human forms such as cartoons, fantasy art or manga.
2. incites, advocates, or expresses pornography, obscenity, vulgarity, profanity, hatred, bigotry, racism, or gratuitous violence.
3. misrepresents the source of anything you post or upload, including impersonation of another individual or entity.
4. provides or creates links to external sites that violate this Code of Conduct.
5. includes content that is protected by intellectual property laws, rights of privacy or publicity, or any other applicable law unless you own or control the rights thereto or have received all necessary consents.
6. is intended to harm or exploit minors in any way.
7. is designed to solicit, or collect personally identifiable information of any minor (anyone under 18 years old), including, but not limited to: name, email address, home address, phone number, or the name of their school.
8. invades anyone's privacy by attempting to harvest, collect, store, or publish private or personally identifiable information, such as passwords, account information, credit card numbers, addresses, or other contact information without their knowledge and willing consent.
9. is illegal or violates any applicable local and national laws; including but not limited to child pornography, bestiality, incest, illegal drugs, software piracy, and harassment.
10. threatens, stalks, defames, defrauds, degrades, victimizes or intimidates an individual or group of individuals for any reason; including on the basis of age, gender, disability, ethnicity, sexual orientation, race or religion; or incites or encourages anyone else to do so.
11. harms or disrupts, or intends to harm or disrupt, another user's computer or would allow you or others to illegally access software or bypass security on Web sites, or servers, including but not limited to spamming.
12. attempts to impersonate a Microsoft employee, agent, manager, host, administrator, moderator, another user or any other person through any means.
13. promotes or otherwise facilitates the purchase and sale of ammunition or firearms.
14. contains or could be considered 'junk mail', 'spam', 'chain letters', 'pyramid schemes', 'affiliate marketing' or unsolicited commercial advertisement.
15. mischaracterizes content you post or upload or contains the same or similar content to other content you have already posted.
16. attempts to manipulate the services, including ranking and reputation systems in the services, by violating any of the provisions of this Code of Conduct, colluding with others on voting or using multiple profiles.
17. offers to make international money transfers for amounts exceeding the asking price of an item, with intent to request a refund of any portion of the payment.
18. contains advertising for money making schemes, discount cards, credit counseling, online surveys or online contests.

TABLE 3

How You May Not Use the Service. In using the service, you may not:

1. use the service in a way that harms us or our affiliates, resellers, distributors, and/or vendors (collectively, the "Microsoft parties"), or any customer of a Microsoft party;
2. engage in, facilitate, or further unlawful conduct;
3. use any portion of the service as a destination linked from any unsolicited bulk messages or unsolicited commercial messages ("spam");
4. use any unauthorized third party software or service to access the Microsoft instant messaging network (currently known as the .NET Messenger Service);
5. use any automated process or service to access and/or use the service (such as a BOT, a spider, periodic caching of information stored by Microsoft, or "meta-searching");
6. use any unauthorized means to modify or reroute, or attempt to modify or reroute, the service;
7. damage, disable, overburden, or impair the service (or the network(s) connected to the service) or interfere with anyone's use and enjoyment of the service; or
8. resell or redistribute the service, or any part of the service.

As with the terms shown in Table 1, the terms shown in Tables 2 and 3 are illustrative.

While violations of the terms of use may comprise various activities, common abusive practices include posting (i.e., uploading) of items of adult-oriented and copyrighted content to the service 108, and the commercial use of web servers supporting the service as large object stores by third party websites. For these and other items of content that are abusive, it has been observed that they tend to get popular over a relatively short period of time. That is, demand for access to abusive items often heats up quickly. The present abuse detection arrangement accordingly is designed to identify these "hot" (i.e., quickly popular) items of content as candidates for being deemed abusive in near real time in an automated manner and then present these candidates in a persistent form to an administrator or analyst (collectively referred to hereinafter as an "administrator) for verification as either abusive or legitimate. "Near real time" here means that hot items can be detected and then quickly verified as abusive or legitimate by the administrator. In many cases the detection can be performed relatively contemporaneously with the occurrence of the abuse, and will be generally significantly faster in achieving results compared with traditional detection techniques.

Figure 2:
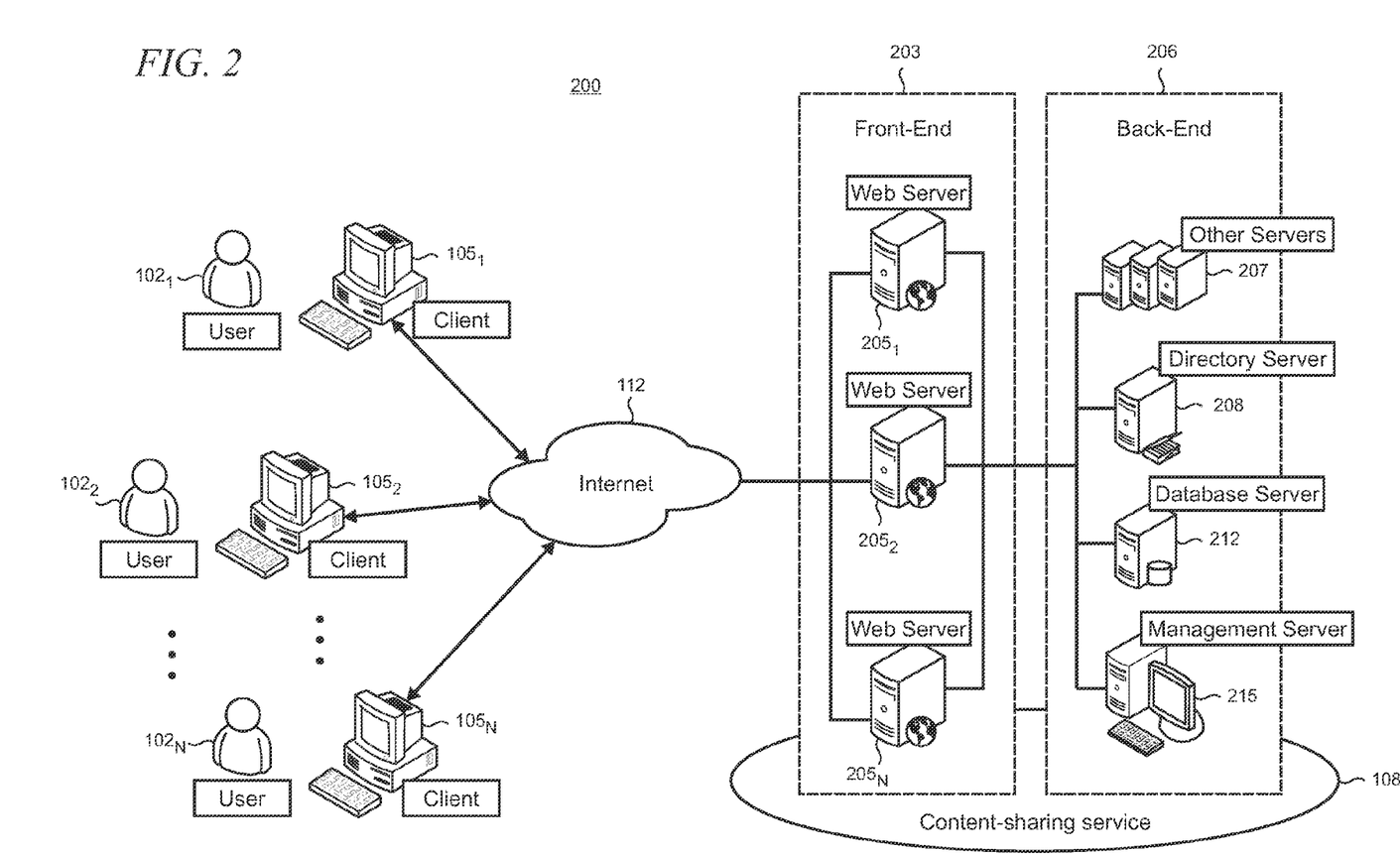
FIG. 2 shows an illustrative web-enabled service architecture that employs a front-end and back-end.

In this example, the present detection of abuse using a distributed cache is implemented using an architecture 200 that employs a front-end sub-system 203 and back-end sub-system 206 as illustratively shown in FIG. 2 to support the service 108. Various users $102_{1, 2 \ldots N}$ connect through respective clients $105_{1, 2 \ldots N}$ over the Internet 112 to the service 108. The service 108 is provided to the user 102 pursuant to terms of use, as described above.

The front-end 203 includes a group of web servers $205_{1, 2 \ldots N}$ that are typically coupled to the external Internet 112 through intermediate network devices such as firewalls, routers, or switches (not shown). The web servers 205 host the content-sharing service 108 for the users 102 and accordingly receive uploads of items of content from the users 102 and serve items in response to access requests.

While the number of web servers 205 can vary among implementations, it would not be unusual for the service 108 to utilize tens, hundreds, or even a thousand or more web servers depending, for example, on the number of users 102 supported. It is further noted that the front-end architecture shown in FIG. 2 is a logical configuration and that the web servers may be physically located in one or more data centers.

The front-end 203 is operatively coupled to the back-end 206 over an internal network that may include a back-end switch or other network device (not shown). The back-end 206 includes a variety of different resources to manage, maintain, and support the service 108. While the resources in the back-end 206 can vary by implementation, in this example they include other servers 207, a directory server 208, a database server 212, and a management server 215. However, the resources shown in FIG. 2 are only illustrative and other resources such as business systems and configuration and management systems may also be utilized.

The other servers 207 may be optionally utilized in those scenarios, for example, where one or more of the front-end web servers 205 are used proxies for servers in the back-end 206. The directory server 208 is typically utilized to authenticate users 102, and provide user management and policy enforcement, although in some situations these processes, in whole or in part, may be supported directly by the front-end web servers 205.

The database server 212 provides database services to the other servers in the service 108. In this example, as described in more detail below in the text accompanying FIG. 4, the database server 212 may be utilized as a persistent store for candidates of abusive items of content with which an administrator of the service 108 may interact using, for example, the management server 215 which typically supports an administrator console functionality.

Figure 3:
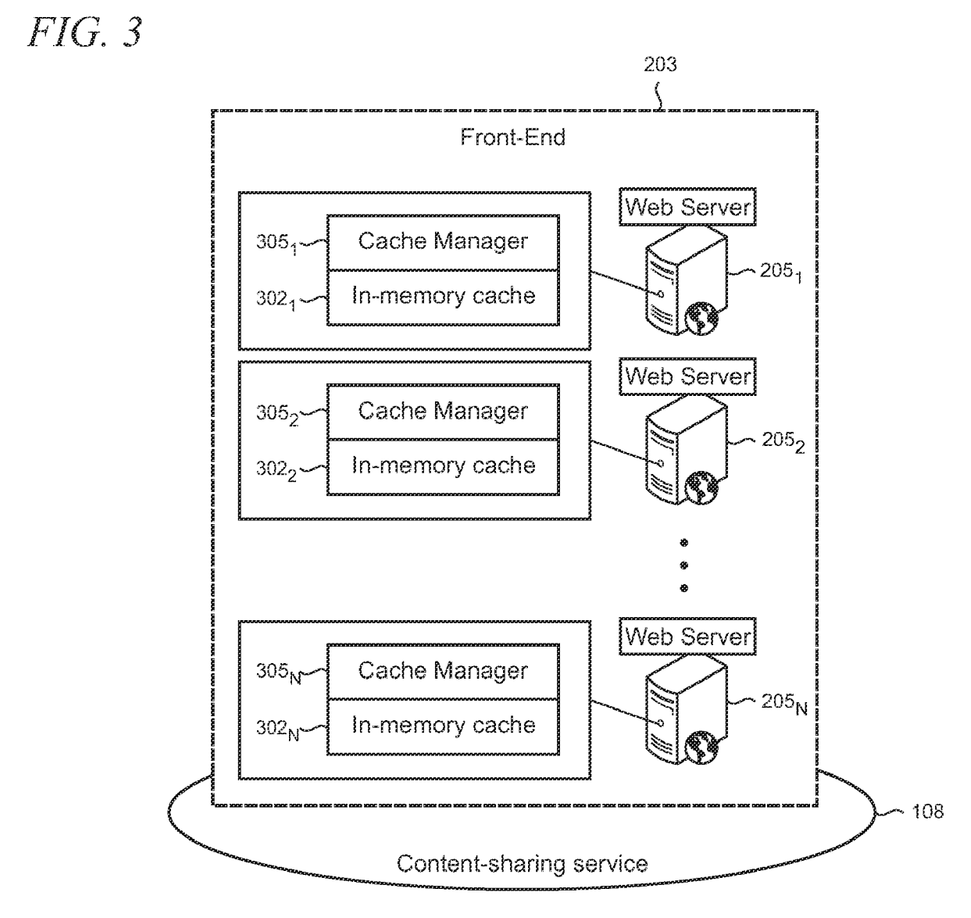
FIG. 3 shows an illustrative distributed in-memory cache used with the front-end web servers.

A distributed in-memory cache 302 is implemented by respective in-memory cache processes $302_{1, 2 \ldots N}$ installed on the respective web servers $205_{1, 2 \ldots N}$ in the front-end 203 as shown in FIG. 3. Associated with each cache process $302_{1, 2 \ldots N}$ is a corresponding cache manager $305_{1, 2 \ldots N}$. While the in-memory cache 302 is distributed across each of the front-end web-servers 205, in alternative arrangements the cache 302 may be implemented on a subset of the web servers 205. In addition, in other alternative arrangements, the cache may be implemented in a persistent or non-volatile manner, or be arranged in a non-distributed manner, for example, using an application that runs on the administrator console.

Caching generally, and specific techniques such as reverse proxy caching, are commonly used to reduce latency, improve the users' perception of responsiveness of the service 108, and can offload traffic from the web servers 205. The size of the distributed cache 302 may be selected to meet the requirements of a specific implementation, but may be generally sized to in the range of several gigabytes per front-end web server. So for example, a cache size of 10 gigabytes per front-end web server 205 provides a distributed cache size of 10 terabytes if 1,000 web-servers 205 are deployed in the front-end 203.

Figure 4:
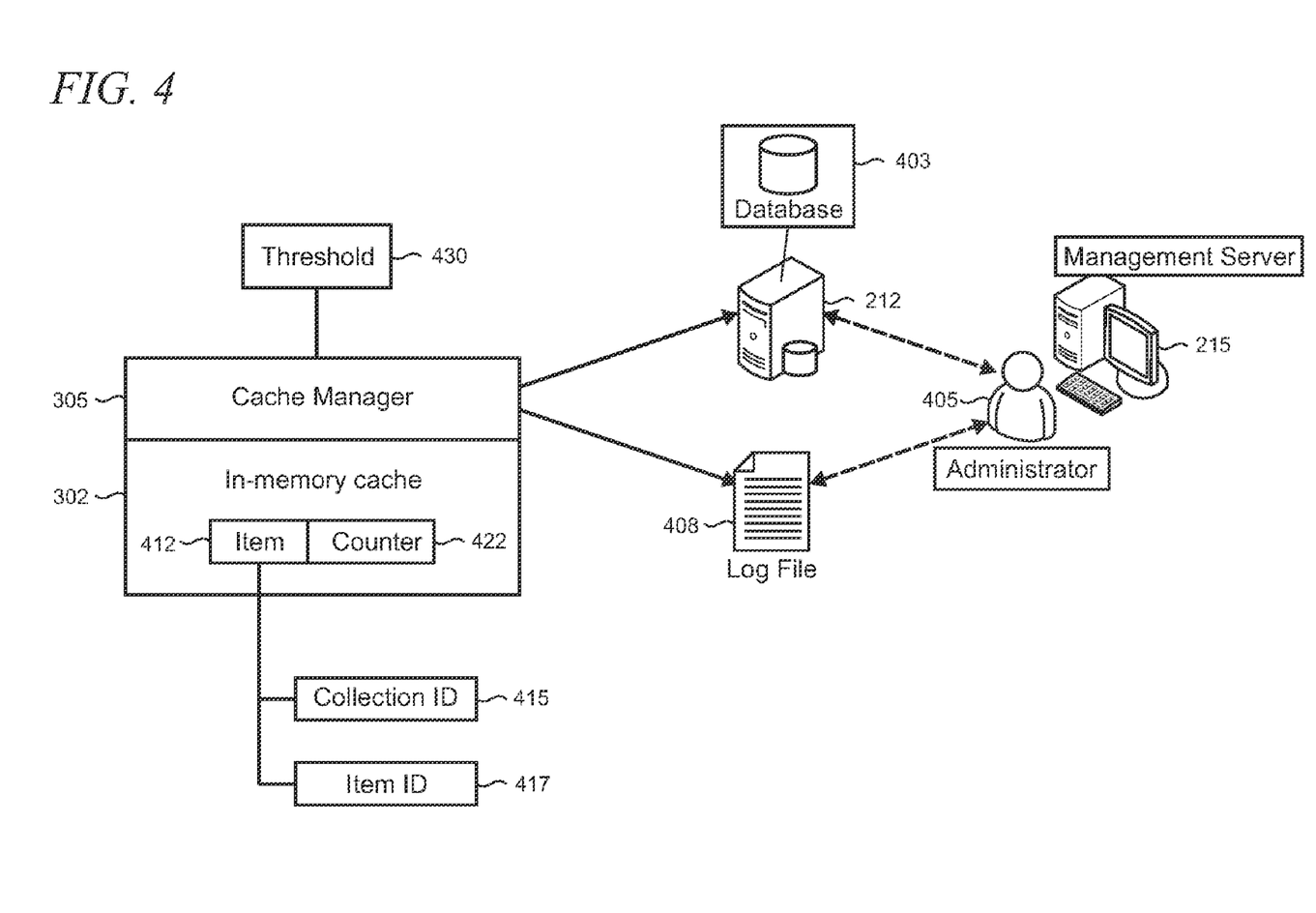
FIG. 4 shows an illustrative cache manager and persistent stores including a log file and database, as well as details pertaining to cached items.

As shown in FIG. 4, the cache manager 305 is arranged to write candidates for abusive items of content in persistent form using, for example, a database 403 on the database server 212 or a log file 408. An administrator 405 for the service 108 may monitor the database 403 or log file 408 to confirm the candidate items as being abusive or as legitimate. The administrator 405 will typically perform the monitoring of the database 403 or log file 408 through the management server 215, as shown.

Content items 412 are cached as a single instance in the distributed cache 302. In this example, each item 412 is identified using a globally unique collection ID 415 and an associated item ID 417. The collection ID 415 is typically used to identify all content that is posted by a particular user 102. The item ID 417 here is configured to identify each item 412 within the collection and is unique across the collection IDs.

A unit of metadata is associated with each cached item 412 which functions as a counter 422 that is used to maintain a count of how many times a particular item 412 is served to a user 102 by a web server 205. The counter 422 is compared against a predetermined threshold 430 which may be set to an arbitrary value or adjusted, for example, by the administrator 405 to set the sensitivity of the detection.

Figure 5:
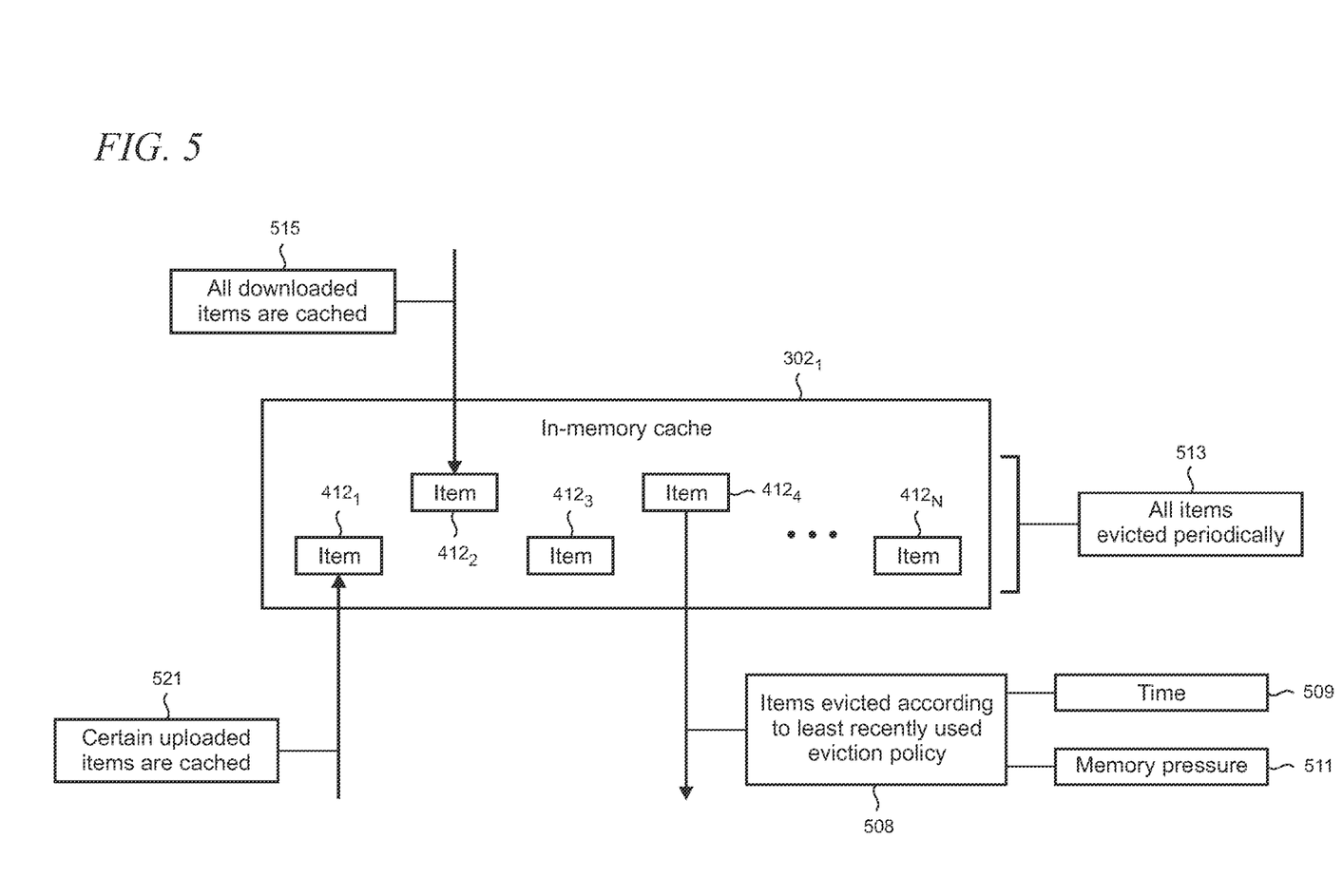
FIG. 5 shows an illustrative flow of items into and out of a cache.

FIG. 5 shows an illustrative flow of items in to and out of an exemplary cache $302_1$ however the flow will be similar across all the caches that collectively form the distributed cache 302. Items 412 are evicted from the cache $302_1$ in accordance with a least-recently-used eviction policy as indicated by reference numeral 508. The eviction policy 508 fires based on either time or memory pressure on the cache, as respectively indicated by reference numerals 509 and 511. So, for example, if item $412_4$ has been in the cache $302_1$ without being accessed and served, then after a pre-determined period of time, it is evicted from the cache.

In some cases, it may be desirable to configure the cache $302_1$ to periodically evict all items as shown by reference numeral 513. In addition, the counters 422 associated with cached items may be periodically reset to further ensure that only items that are potentially abusive are identified as candidates. These techniques may be applied when legitimate items tend to linger in the cache and are accessed relatively infrequently. In such scenarios, unless it is evicted or its counter is reset, the item could be wrongly identified as a candidate for being abusive when its counter exceeds the threshold even though it is actually a legitimate item.

Typically, when an item 412 is served for downloading it is cached as indicated by reference numeral 515. In addition, when a user 102 uploads an item to the service 108, there is a presumption that some associated renderings of the item will be immediately subject to download and thus such renderings will also be cached, as indicated by reference numeral 521. For example, when the user 102 uploads a high-resolution photograph to the service 108, an agent running on the client 105 will typically generate an associated lower-resolution web-ready rendering as well as a low-resolution thumbnail of the photograph. As the service 108 may typically show the thumbnail to the user upon upload of the photograph, the thumbnail will be cached when it is uploaded.

Figure 6:
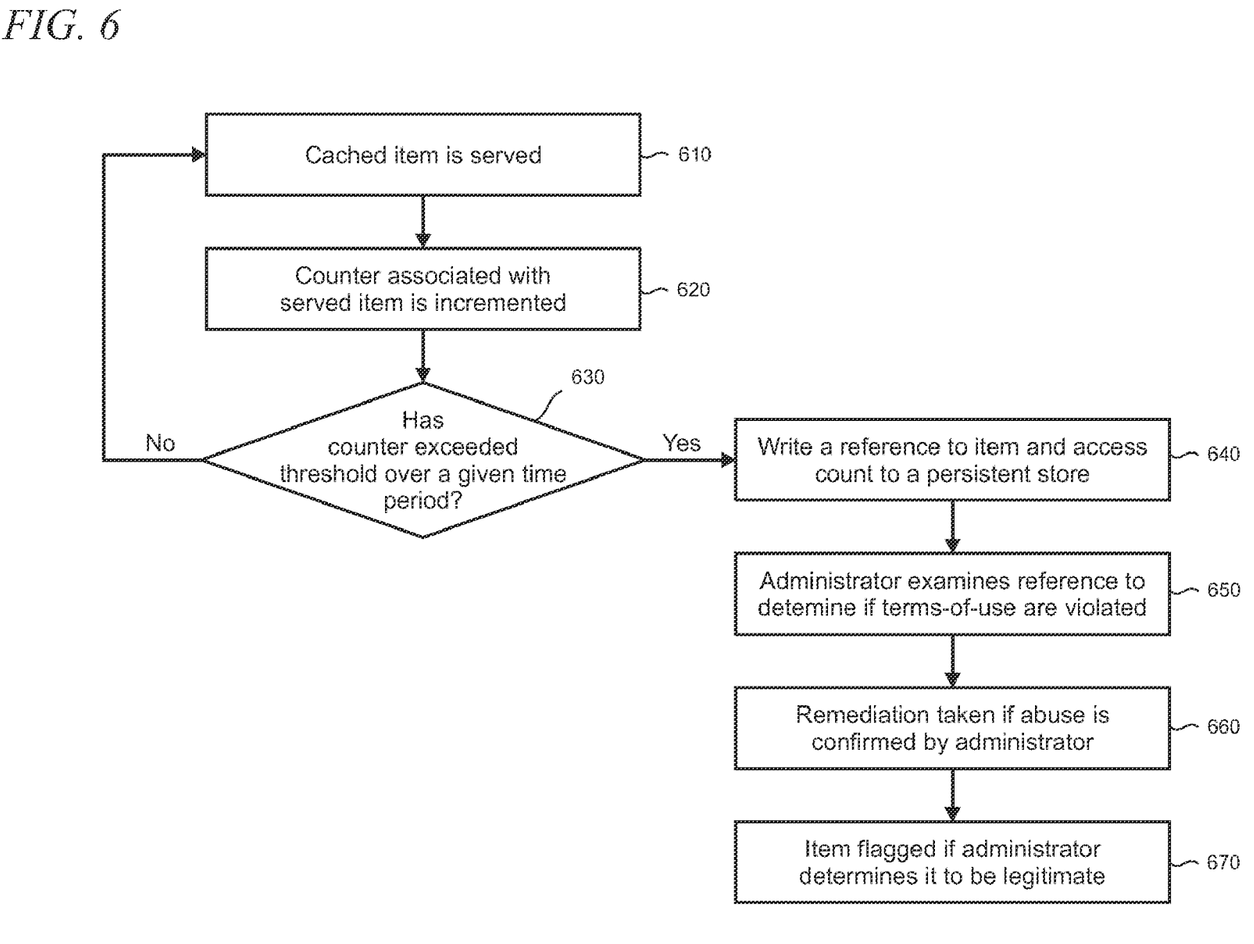
FIG. 6 shows a flowchart for an illustrative method that may be utilized to detect abuse.

FIG. 6 shows a flowchart for an illustrative method that may be utilized to detect abuse by various components in architecture 200. The method begins when a cached item 412 is served by a web server 205 (610) in response to an access request from a user 102. The counter 422 associated with the served item 412 is incremented (620) and then checked against the threshold 430 (630). This process of serving, incrementing, and checking is iterated each time the item 412 is served until the threshold is exceeded over a pre-determined time period which may be selected to suit the requirements of the particular implementation.

When the counter 422 is exceeded, its associated item 412 is a candidate for being deemed abusive. A reference to the item and the access count is written to a record in a persistent storage such as the database 403 or log file 408 (640). The administrator 405 who is monitoring the database 403 or log file 408 will then examine the record to determine if the candidate item represents a violation of the terms of use 115 (650).

If the administrator 405 confirms that the candidate item 412 violates the terms of use 115 and is abusive, then various steps can be implemented to remediate the abuse (660). Such remediation can vary among implementations and may take into account the specific circumstances involved. For example, if the item 412 is a photograph which depicts nudity, the item can be removed by the service 108 and the responsible user 102 notified of the violation. Repeated violations may result in all of the user's items (i.e., as identified by the collection ID 415) being removed and the user's ability to post items to the service 108 being suspended or terminated altogether. Violations of the terms of use which appear to involve criminal acts may result in immediate shut down of the user's collection and trigger notification of the user's violations and associated activities to the appropriate law enforcement or agencies for further action.

If the administrator 405 determines that the candidate item 412 does not violate the terms of use 115 and is legitimate, the item will be flagged (670) so that it does not need to be examined again by the administrator.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An automated method for detecting abuse of a content-sharing service, the method comprising the steps of
    caching a plurality of items of content in a cache associated with a server that serves sharable content from the content-sharing service;
    associating a unit of metadata with each item in the cache, the unit of metadata being arranged as a counter for tracking an access count of an item, the counter being incremented when a cached item is served by the server;
    comparing the counter against a threshold over a set time interval; and
    nominating an item as an abuse candidate when the counter exceeds the threshold.

2. The automated method of claim 1 including a further step of evicting an item from the cache in accordance with a least-recently-used eviction policy that is triggered by either time or memory pressure on the cache.

3. The automated method of claim 2 in which the comparing is performed when the counter is incremented or upon evicting an item from the cache.

4. The automated method of claim 3 including a further step of writing a reference including the abuse candidate and the access count to a persistent store, the persistent store being selected from one of database or log file.

5. The automated method of claim 4 including a further step of presenting the reference to an administrator or analyst to confirm or reject the abuse candidate.

6. The automated method of claim 5 including a further step of accepting an input from the administrator or analyst to flag an item if it is determined to be legitimate.

7. The automated method of claim 6 including a further step of periodically resetting the counter to an initial state.

8. The automated method of claim 7 including a further step of periodically evicting all items from the cache.

9. The automated method of claim 8 in which the cache is configured as a reverse proxy cache.

10. The automated method of claim 9 including a further step of distributing the cache across a plurality of servers utilized to implement the content-sharing service and caching each of the plurality of items as a single instance in the distributed cache.

11. The automated method of claim 10 in which each of the plurality of items is identified by a globally unique ID.

12. A method for implementing a distributed cache used with a plurality of servers supporting a content-sharing service, the method comprising the steps of:
   distributing a cache across each of the servers to implement the distributed cache;
   caching items of shareable content in the distributed cache, each of the cached items being represented as a single instance in the distributed cache;
   performing a count as each item is served from the cache over a pre-determined interval; and
   triggering an event when the count exceeds a threshold to detect abuse of the content-sharing service in near real time.

13. The method of claim 12 in which the cache is implemented as an in-memory process running in native code on each of the servers.

14. The method of claim 12 in which the count is performed by associating a counter with each of the items in the cache and incrementing the counter when the item is served.

15. The method of claim 12 in which the event is utilized to indicate a potential breach of terms of use that are applicable to the content-sharing service.

16. The method of claim 12 in which the event comprises writing a reference, which identifies an item and its associated count, to a persistent store.

17. A method for managing a distributed cache that is implemented across a plurality of web servers, the method comprising the steps of:
   using the plurality of web servers to provide a content-sharing service to users, the users being subject to terms of use when using the content-sharing service;
   caching items of content in the distributed cache to be served responsively to requests from the users for accessing content from the content-sharing service; and
   detecting potential violations by a user of the terms of use by counting items when served from the cache over an arbitrary time interval.

18. The method of claim 17 including a further step of manually confirming the violations.

19. The method of claim 17 in which the terms of use include at least one of prohibition on uploading pornography, adult-oriented content, or copyrighted content, or use of the service as a large object store by third party websites.

20. The method of claim 17 in which items are cached in the distributed cache upon download from a web server, or upon upload to the web server when a rendering of an item is presumed to be immediately downloaded.

* * * * *